United States Patent [19]

Takahashi

[11] Patent Number: 4,533,227
[45] Date of Patent: Aug. 6, 1985

[54] DISTANCE MEASURING CIRCUIT

[75] Inventor: Akira Takahashi, Kawasaki, Japan

[73] Assignee: Ricoh Company, Ltd., Tokyo, Japan

[21] Appl. No.: 599,772

[22] Filed: Apr. 13, 1984

Related U.S. Application Data

[63] Continuation of Ser. No. 299,291, Sep. 3, 1981, Pat. No. 4,479,706.

[30] Foreign Application Priority Data

| Sep. 9, 1980 [JP] | Japan | 55-125168 |
| Sep. 9, 1980 [JP] | Japan | 55-125169 |
| Sep. 9, 1980 [JP] | Japan | 55-125170 |
| Sep. 30, 1980 [JP] | Japan | 55-136366 |
| Sep. 30, 1980 [JP] | Japan | 55-136367 |

[51] Int. Cl.³ ............................................. G03B 3/00
[52] U.S. Cl. ........................................ 354/403; 354/409
[58] Field of Search ................... 354/403, 409, 415

[56] References Cited

U.S. PATENT DOCUMENTS

| 4,032,934 | 6/1977 | Hendrickson et al. | 354/403 |
| 4,256,995 | 3/1981 | Ishida | 354/415 |
| 4,268,137 | 5/1981 | Cocron et al. | 354/403 |
| 4,298,258 | 11/1981 | Matsuda et al. | 354/403 |
| 4,300,824 | 11/1981 | Tokuda et al. | 354/403 |
| 4,302,084 | 11/1981 | Greenwald et al. | 354/409 |
| 4,303,319 | 12/1981 | Hell et al. | 354/403 |
| 4,313,655 | 2/1982 | Hell et al. | 354/409 |
| 4,344,024 | 8/1982 | Cocron | 354/403 |
| 4,357,083 | 11/1982 | Johnson et al. | 354/415 |

Primary Examiner—Russell E. Adams
Attorney, Agent, or Firm—Oblon, Fisher, Spivak, McClelland & Maier

[57] ABSTRACT

A distance measuring circuit controls in a given sequence a distance measuring operation in which a light beam is periodically projected to a target by means of a light projector and reflected light from the target is received by a light receiver, the output signal of which is utilized to determine the distance to the target. When the light projector is not energized, a capacitor is charged by a d.c. source, and discharges to drive the light projector when the light beam is to be projected.

1 Claim, 51 Drawing Figures

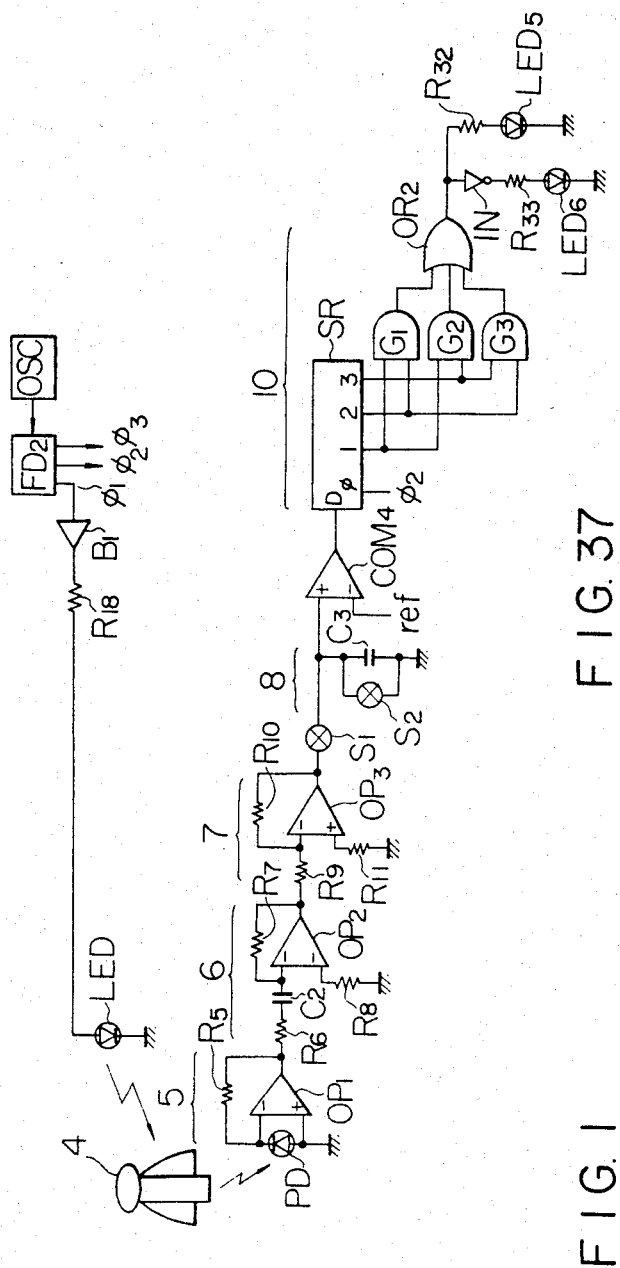
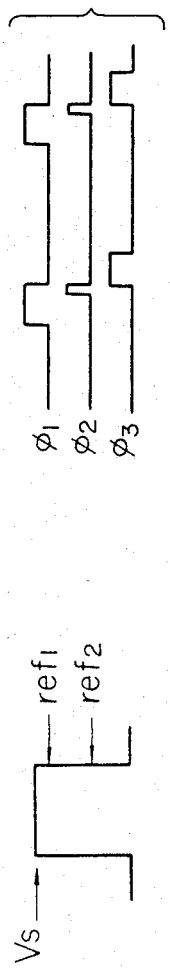
FIG. 36
FIG. 37
FIG. 1

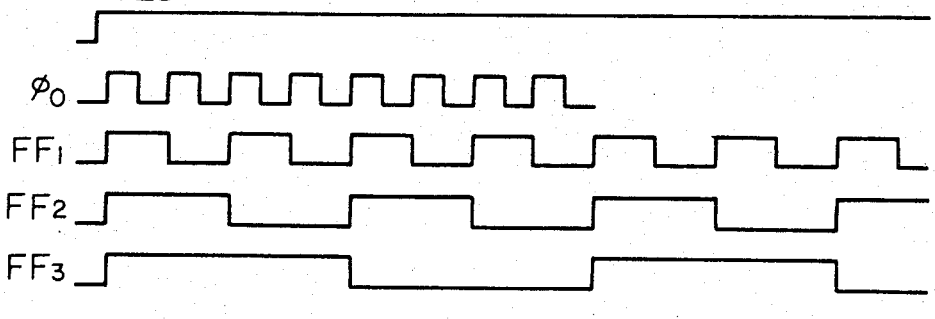
FIG. 3

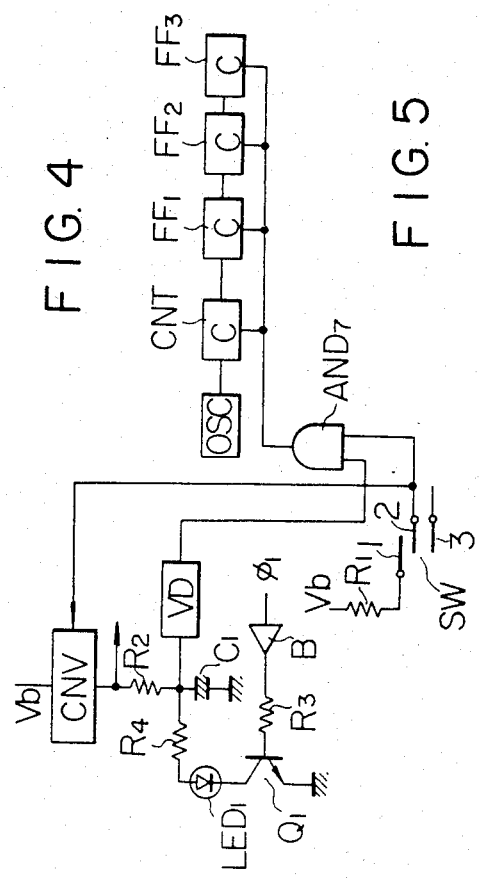
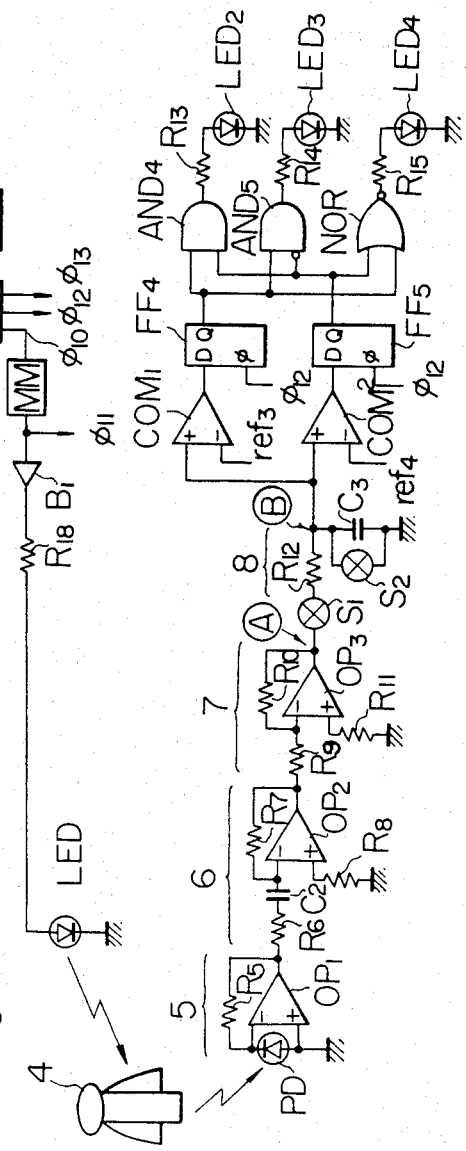
FIG. 4
FIG. 5

FIG. 14B OUTPUT AT A

FIG. 15
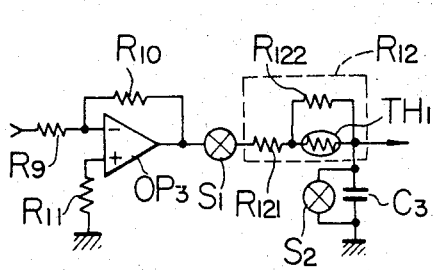
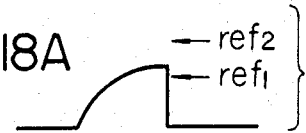
FIG. 18A
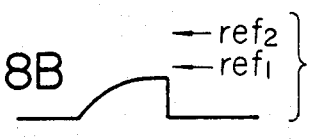
FIG. 18B
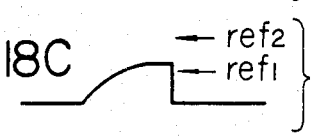
FIG. 18C
FIG. 17
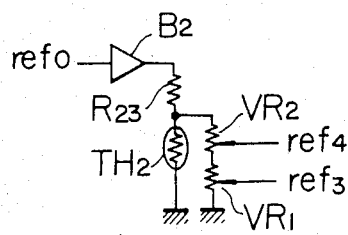
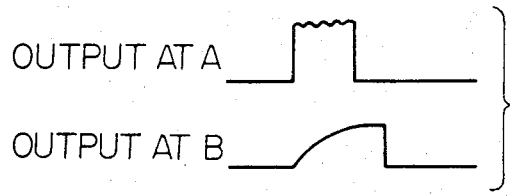
FIG. 16A
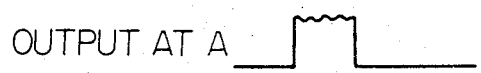
FIG. 16B  OUTPUT AT A
FIG. 16C  OUTPUT AT B
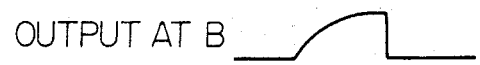
FIG. 16D  OUTPUT AT B

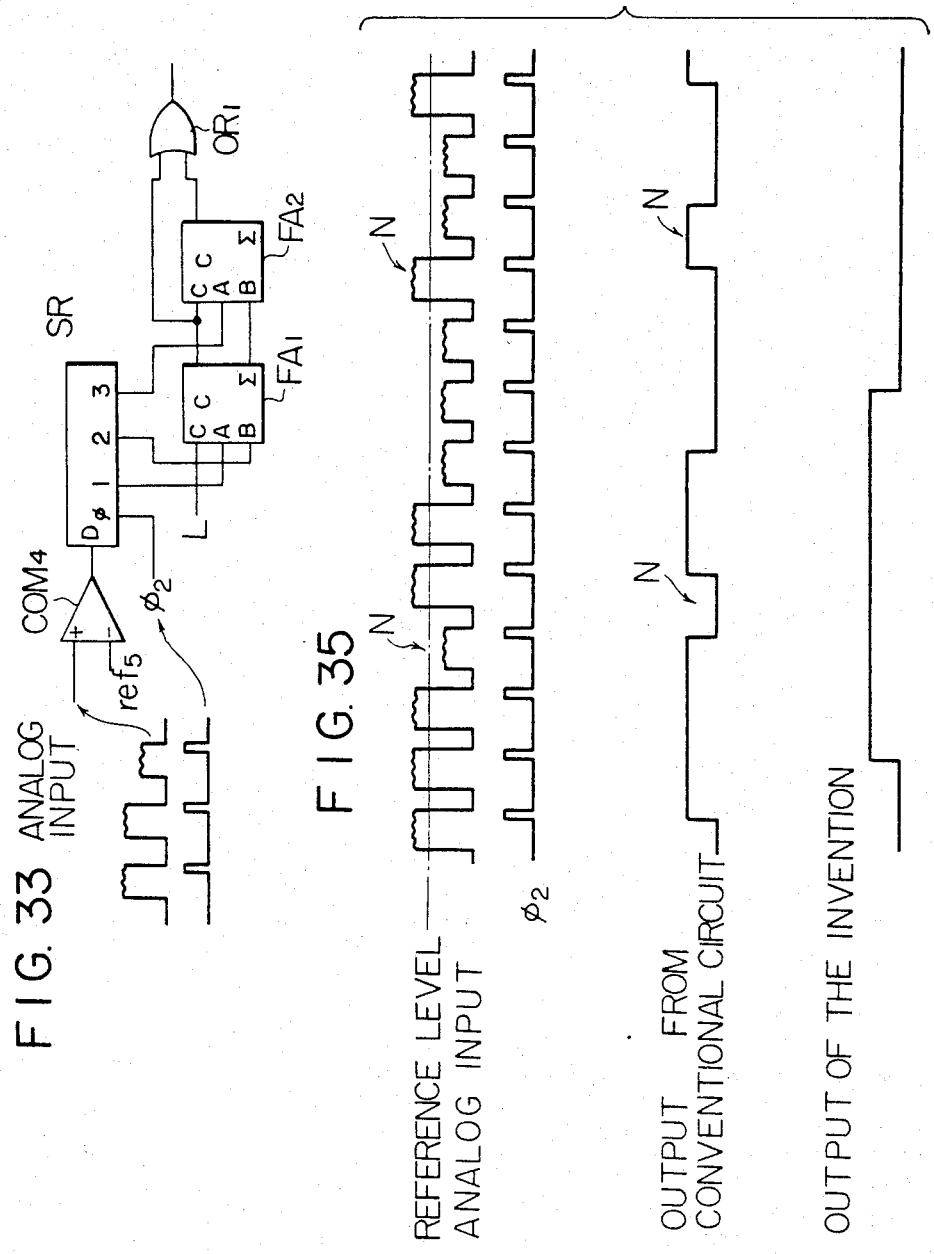

DISTANCE MEASURING CIRCUIT

This is a continuation of application Ser. No. 299,291, filed Sept. 3, 1981, now U.S. Pat. No. 4,479,706.

BACKGROUND OF THE INVENTION

The invention relates to a distance measuring circuit which may be used in a photographic camera or the like.

Currently, a distance measuring circuit which is utilized in an auto-focus circuit of a photographic camera operates on the principle of a double image coincidence technique in which the image of an object being photographed is projected onto a pair of light receivers, and the image projected onto one of light receivers is mirror-scanned under the resilience of a spring in response to the depression of a release button in order to determine the point where the images projected on both of the receivers coincide with each other to thereby determine the distance to the object being photographed. However, the mirror scan under the resilience of a spring prevents a plurality of distance measuring operations to be performed in succession. In addition, if the release button is rapidly depressed, the sequence may not proceed in a proper form.

As an alternative, a distance measuring circuit is proposed which utilizes the attenuation of the light intensity in proportion to the square of the distance. Specifically, a light beam is continuously projected to an object being photographed by means of a light projector, and reflected light from the object is received by a light receiver in order to detect the output signal level of the receiver. However, the detection of the intensity of reflected light from the object being photographed causes a reduced accuracy in the determination of the distance as a result of variations in the light output from the projector. The accuracy is further reduced if extraneous light is incident on the light receiver or electrical noises are applied to the output signal therefrom.

In the latter arrangement, the distance may be subdivided into three ranges, for example, short distance, medium distance and long distance, and a determination may be made as to in which range the object is located. In such instance, the signal from the light receiver is amplified by an amplifier before it is compared against a pair of different reference voltages ref1 and ref2 in a pair of comparators, which determine in which range the object is located. In this instance, it is necessary to provide an arrangement such that an input voltage to the comparators do not saturate intermediate the reference voltages ref1 and ref2, as illustrated in FIG. 1, where Vs represents a saturation point. In the event the amplifier has a low saturation point or utilizes a low supply voltage, the reference voltages ref1, ref2 will be located close to each other, increasing the likelihood that a wrong determination may be caused by noises.

In the latter arrangement, a Schmidt circuit is used to eliminate noises from an output signal from the light receiver. While the use of such Schmidt circuit allows noises as produced by fluorescent lamps or the like to be eliminated, a hysteresis in operating level is introduced to degrade the accuracy.

SUMMARY OF THE INVENTION

It is the principal object of the invention to provide a distance measuring circuit of light projection type in which a distance measuring operation is controlled in a given sequence.

In accordance with the invention, the need for a mirror scan is eliminated, and a plurality of distance measuring operations can be performed in succession. When utilized in a photographic camera, a rapid depression of a release button does not affect the normal achievement of a distance measuring operation.

It is another object of the invention to provide a distance measuring circuit including a capacitor which is charged from a d.c. source when light projection does not take place but which discharges to drive a light projector for projecting a light beam, thereby permitting the use of a battery of a small capacity.

It is a further object of the invention to provide a distance measuring circuit which prevents a malfunctioning by inhibiting a distance measuring operation if a power supply circuit including a capacitor provides a voltage which is less than a given value.

It is an additional object of the invention to provide a distance measuring circuit which assures a high accuracy by preventing any variation in the output from a light projector.

It is still another object of the invention to provide a distance measuring circuit which assures a high accuracy by providing a compensation for a variation in the output from a light projector.

It is still additional object of the invention to provide a distance measuring circuit in which a signal from a light receiver is fed to a plurality of amplifiers which are connected in parallel with each other and having different gains so that a comparison of their outputs with a reference value allows a determination of a particular range in which a distance to a target is located. According to the invention, the apparent difference between voltage levels which define the individual ranges may be increased, thus increasing the immunity against noises. In this manner, a malfunctioning is prevented if the amplifier has a low saturation point or a low supply voltage is used.

It is yet another object of the invention to provide a distance measuring circuit which provides immunity against extraneous light by extracting a portion of a signal from a light receiver which corresponds to the light beam projected by a light projector, by means of a semiconductor switch.

It is yet further object of the invention to provide a distance measuring circuit which assures a high accuracy of distance determination, by integrating a signal from a light receiver to provide a discrimination against noises.

It is also an object of the invention to provide a distance measuring circuit which assures a high accuracy of distance determination, by averaging a signal from a light projector to provide a discrimination against noises.

It is another object of the invention to provide a distance measuring circuit which allows a distance determination of a high accuracy to be achieved, by eliminating noises through a digital processing of a signal from a light receiver.

BRIEF DESCRIPTION OF THE DRAWINGS

FIG. 1 graphically illustrates certain operating levels which are useful in describing a conventional distance measuring circuit.

FIG. 3 is a timing chart illustrating the operation of the embodiment shown in FIG. 2.

FIG. 4 is a circuit diagram of part of another embodiment of the invention.

FIG. 5 is a circuit diagram of a further embodiment of the invention.

FIGS. 13 and 14A to 14D graphically show a series of waveforms relating to the embodiment shown in FIG. 12.

FIG. 15 is a circuit diagram of part of a further embodiment of the invention.

FIGS. 16A to 16D graphically show a series of waveforms relating to the embodiment shown in FIG. 15.

FIG. 17 is a circuit diagram of part of another embodiment of the invention.

FIGS. 18A to 18C graphically show a series of waveforms relating to the embodiment shown in FIG. 17.

FIGS. 33 and 34 are block diagrams of certain forms of noise elimination circuit in the present invention.

FIG. 35 is a timing chart illustrating the operation of the noise elimination circuit.

FIG. 36 is a circuit diagram of another embodiment of the invention.

FIG. 37 is a timing chart illustrating output pulses from a frequency divider used in the embodiment of FIG. 36.

DESCRIPTION OF PREFERRED EMBODIMENTS

Figure 2A:
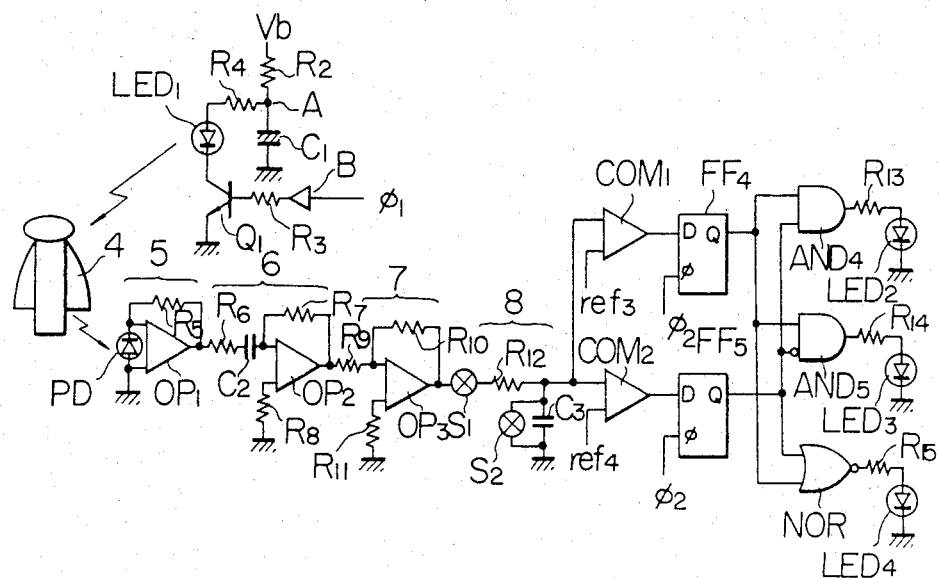
FIGS. 2A and 2B are circuit diagrams of one embodiment of the invention.
Figure 2B:
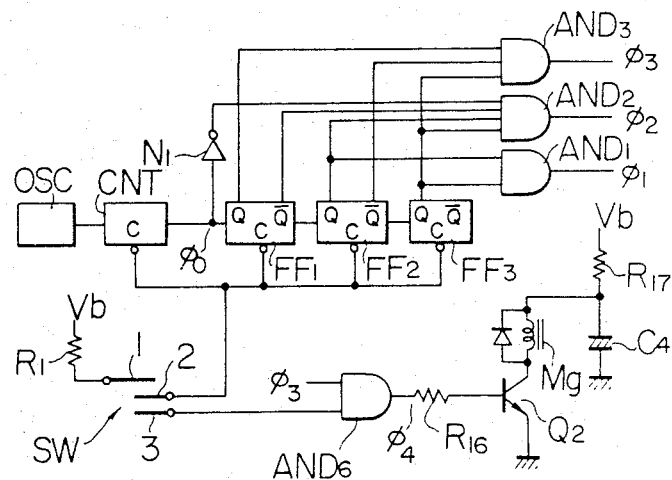

FIGS. 2A and 2B show one embodiment of the invention, and FIG. 3 graphically shows a timing chart which relates to the operation of the embodiment. The present embodiment illustrates the application of the invention to an auto-focus circuit of a photographic camera. A release switch SW includes three contacts 1 to 3, with the contact 1 being connected through a resistor R1 to a power source Vb. When the release switch SW is depressed to the limit of its first stroke, the contact 1 and 2 are connected together, and a high level signal from the contact 2 activates a plurality of flipflops FF1 to FF3 and a counter CNT. Consequently, a pulse produced by an oscillator OSC is frequency-divided by the counter CNT, and is additionally frequency-divided by the flipflops FF1 to FF3. It is to be understood that the counter CNT is triggered by a falling edge of an input pulse while the flipflops FF1 to FF3 are triggered by a rising edge of an input pulse. Q outputs from the flipflops FF2, FF3 are supplied to AND circuit AND1, which produces a pulse output $\phi1$. An output pulse $\phi0$ from the counter CNT is inverted by an inverter N1 before it is supplied to one input of AND circuit AND2. AND circuit AND2 also receives OVS /Q/ output of flipflop FF1 and Q outputs of flipflops FF2, FF3 to produce a pulse output $\phi2$. AND circuit AND3 receives Q outputs from the flipflops FF1, FF3 and $\overline{Q}$ output from the flipflop FF2 to produce a pulse output $\phi3$. The relationship between these pulses $\phi1$ to $\phi3$ is illustrated in FIG. 3 where it will be noted that the pulse $\phi2$ is produced toward the falling edge of the pulse $\phi1$ while the pulse $\phi3$ rises in coincidence with the falling edge of the pulse $\phi1$. These pulses $\phi1$ to $\phi3$ determine a given sequence for performing a distance measuring operation.

Considering now the arrangement of a light projector, a combination of a capacitor C1 and a resistor R2 forms together a power supply circuit, and when a transistor Q1 is off, the capacitor C1 is charged through the resistor R2 from the power source Vb. When the pulse $\phi1$ is applied to the base of the transistor Q1 through a buffer B and a resistor R3, the transistor Q1, which operates as a switching element, is turned on to cause the capacitor C1 to discharge through a path including a resistor R4 and a light projector LED1 which is formed by a light emitting diode. Consequently, the projector LED1 projects a light beam toward an object 4 being photographed intermittently or periodically. If the duration of the current flow to the projector LED1 is short, a current of an increased magnitude can be supplied thereto while maintaining the average current drawn from the power supply at a low level. In this manner, the power sourc Vb may comprise a battery of a small capacity.

A light receiver PD is formed by a photodiode, and receives reflected light from the object 4 to convert it into a corresponding electrical signal. This signal is amplified by a sensor amplifier 5 formed by a combination of an operational amplifier OP1 and a resistor R5. An output signal from the amplifier 5 is fed to a high pass filter 6 comprising an operational amplifier OP2, a capacitor C2 and resistors R6 to R8. The filter removes a d.c. component and low frequency components of the signal while the remaining signal is amplified by a subsequent amplifier 7 which comprises an operational amplifier OP3 and resistors R9 to R11. An output signal from the amplifier 7 is passed through an analog switch S1 in timed relationship with the pulse $\phi1$ to be integrated by an integrating circuit 8 formed by a combination of a resistor R12 and a capacitor C3. An analog switch S2 is turned on by the pulse $\phi3$ to reset the integrating circuit 8. An output signal from the integrating circuit 8 is compared against a pair of reference voltages ref3, ref4 in a pair of comparators COM1, COM2. The results of comparison are latched into latch circuits FF4, FF5, both formed by D-type flipflops, in response to the pulse $\phi2$. The Q outputs of the latch circuits FF4, FF5 are applied to each of AND circuits AND4, AND5 and NOR circuit NOR. One of the input terminals of AND circuit AND5 represents an inhibit terminal. When the object 4 to be photographed is located at a short distance and both outputs from the flipflops FF4, FF5 assume a high level, the output of AND circuit AND4 is applied through a resistor R13 to illuminate a light emitting diode LED2. When the object 4 is located at a medium distance and the output from the flipflop FF4 assumes a high level while the output from the flipflop FF5 assumes a low level, the output of AND circuit NAD5 is applied through a resistor R14 to illuminate a light emitting diode LED3. Finally, when the object 4 is located at a long distance and both outputs from the flipflops FF4, FF5 assume a low level, the output of NOR circuit NOR is applied through a resistor R15 to illuminate a light emitting diode LED4. These diodes LED2 to LED4 are selectively illuminated within a viewfinder of a photographic camera to provide a display of distance.

When the release switch SW is further depressed through its second stroke to connect the contacts 1 to 3 together, AND circuit AND6 receives a high level output from the contact 3 and also the pulse $\phi 3$ to thereby produce a pulse $\phi 4$. The pulse $\phi 4$ is applied through a resistor R16 to the base of a transistor Q2, thus turning it on. Thereupon a capacitor C4 discharges through a release electromagnet Mg to energize it, thus effecting a mechanical release. The capacitor C4 is normally charged through a resistor R17 from the power source Vb when the transistor Q2 remains off. It will be seen from FIG. 3 that the pulse 3 is produced subsequent to the occurrence of the pulses $\phi 1$ and $\phi 2$ or after the completion of a distance measuring operation. Accordingly, when the pulse 4 is produced, desired distance information has been already obtained so that a normal focusing is possible if the release is allowed. In the present arrangement, the sequence of distance measuring operations is initiated after the depression of the release switch SW through its first stroke to connect the contacts 1, 2 together, so that a rapid depression of the release switch SW does not interfere with the achievement of a normal distance measuring operation. Alternatively, the sequence of distance measuring operations may be initiated, immediately after the power source is turned on.

FIG. 4 shows part of another embodiment of the invention. In this embodiment, the voltage of the power source Vb is boosted by a d.c.-d.c. converter CNV before it is applied to the capacitor C1 through the resistor R2. The output voltage from the converter CNV is also applied to other circuits. The converter CNV is turned in response to a high level output from the contact 2. A voltage detector Vd is connected to determine when the voltage across the capacitor C1 reaches a given value, whereupon it produces a high level output to feed AND circuit AND7. In response to the high level output from the detector VD and the high level signal from the contact 2, AND circuit AND7 produces an output which activates the counter CNT and the flipflops FF1 to FF3. Accordingly, a release signal from the contact 2 is inhibited from initiating a distance measuring operation until the voltage across the capacitor C1 reaches a given value, thus avoiding a wrong distance distermination. In this embodiment, other parts are constructed in the same manner as shown in FIG. 2.

In this embodiment, an electronic flash may be used in place of the light projector. The voltage detector VD is then connected to detect the voltage across a main capacitor which is contained in the electronic flash.

When a light beam is projected toward an object being photographed and reflected light from the object is received to determine the level thereof for purpose of determining a distance to the object in a given sequence, the need for a mirror scan is eliminated, permitting a plurality of distance measuring operations to be performed in succession. Also, a rapid depression of a release button cannot inerefere with a proper achievement of a distance measuring operation. By charging the capacitor C1 when no light beam is projected, and utilizing the capacitor C1 to drive the light projector, the use of a battery of a small capacity is permitted. By inhibiting a distance measuring operation when the voltage of a power supply circuit including the capacitor C1 does not reach a given value, a malfunctioning can be prevented.

Figure 6:
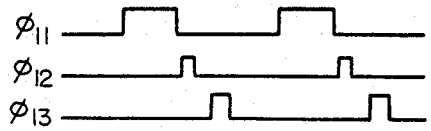
FIG. 6 is a timing chart illustrating the timing of occurrence of pulses used in the embodiment of FIG. 5.

FIG. 5 shows an embodiment of the invention which compensates for a variation in the light emission output from a light projector. In this embodiment, a frequency divider FD is connected to frequency-divide a pulse from the oscillator OSC to produce a plurality of pulses $\phi 10$, $\phi 12$ and $\phi 13$. A monostable multivibrator MM is triggered by the pulse $\phi 10$ to a pulse $\phi 11$. The timing of these pulses $\phi 10$ to $\phi 13$ is illustrated graphically in FIG. 6. The pulse $\phi 11$ is applied to a light projector LED1, formed by a light emitting diode, through a buffer B1 and a resistor R18. Accordingly, the projector LED1 projects a light beam toward an object 4 being photographed intermittently, and reflected light therefrom is detected by a photodiode PD in the same manner as mentioned above. In the present embodiment, the pulse $\phi 11$ enables an analog switch S1, while analog switch S2 is enabled by the pulse $\phi 13$ to short-circuit a capacitor C2, thus resetting an integrating circuit 8. The results of comparison from comparators COM1, COM2 are latched into latch circuits FF4, FF5, formed by D-type flipflops, in response to the pulse $\phi 12$.

Figure 7:
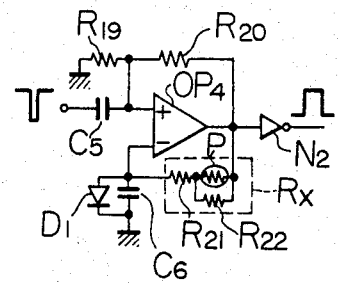
FIG. 7 is a circuit diagram of a monostable multivibrator used in the embodiment of FIG. 5.
Figure 8:
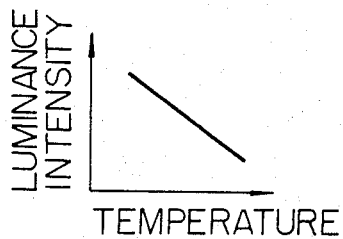
FIGS. 8, 9, 10 and 11A to 11C graphically illustrate the responses and certain waveforms relating to the embodiment shown in FIG. 5.
Figure 9:
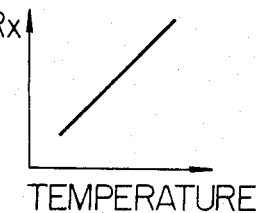
Figure 10:
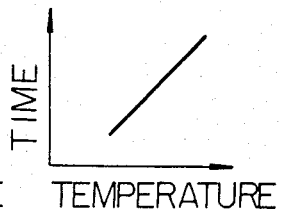
Figure 11A:
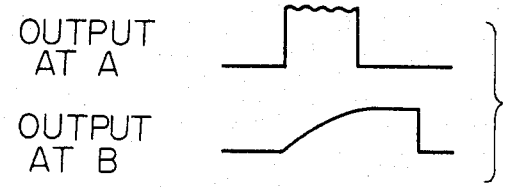
Figure 11B:
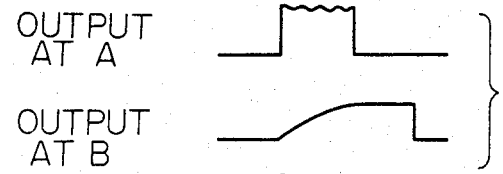
Figure 11C:
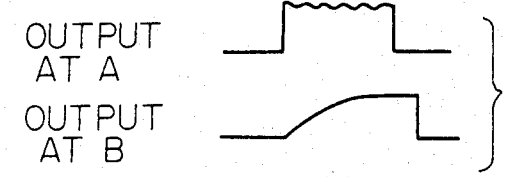

Referring to FIG. 7, it will be seen that the monostable multivibrator MM comprises an operational amplifier OP4, capacitors C5, C6, an inverter N2, a posistor P, a diode D1 and resistors R19 to R22. The pulse $\phi 11$ produced by the monostable multivibrator MM has a width which is determined by the composite resistance Rx of the posistor P and resistors R21, R22 and the capacitance of the capacitor C6. It will be seen that the width depends on the temperature since the resistance of the posistor P varies with the temperature, thus acting as temperature detecting means. Specifically, the resistance Rx varies with the temperature T in a manner illustrated in FIG. 9, thus changing the width of the pulse $\phi 11$. Accordingly, the time interval during which the analog switch S1 is turned on by the pulse $\phi 11$ varies with the temperature T as illustrated in FIG. 10, and the luminous intensity provided by the light projector LED1 changes with the temperature as shown in FIG. 8. The overall results is that the time of integrating the output signal from the amplifier 7 by means of the integrating circuit 8 changes with the temperature, thus compensating for a variation in the output from the light projector LED1. By way of example, FIG. 11A illustrates an output signal from the amplifier 7 or the potential at point A and an output signal from the integrating circuit 8 or the potential at point B at normal temperatures. As the temperature rises, if no temperature compensation is made as in the prior art, FIG. 11B illustrates that such output signal decreases in response to a reduction in the output from the light projector while FIG. 11 C illustrates that the output signal from the integrating circuit 8 remains at the same value as it is at normal temperatures if the temperature compensation according to the invention is utilized.

Figure 12:
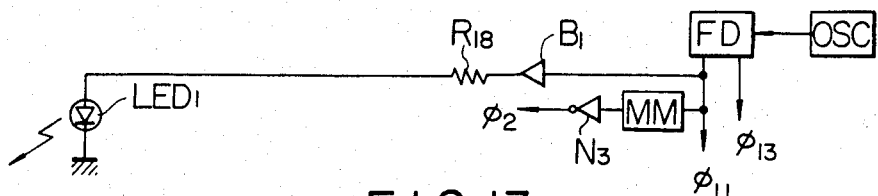
FIG. 12 is a block diagram of part of another embodiment of the invention.
Figure 13:
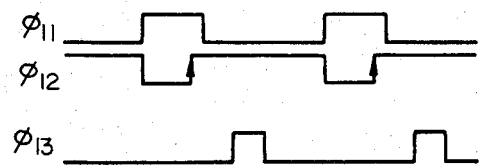
Figure 14A:
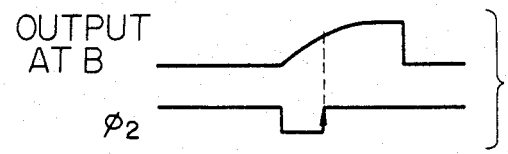
Figure 14C:
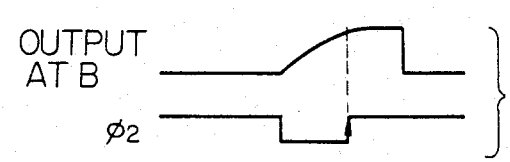
Figure 14D:
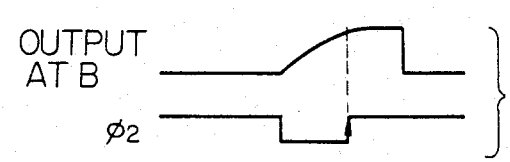

FIG. 12 shows part of a further embodiment of the invention which illustrates another way of compensating for a variation in the output from the light projector, by controlling the timing to operate the latch circuits. In this embodiment, a frequency divider FD such as shown in FIG. 5 frequency-divides the pulse from an oscillator OSC to produce pulses $\phi 11$ and $\phi 13$, with the pulse $\phi 11$ triggerring a monostable multivibrator MM. The monostable multivibrator MM is provided with a temperature compensation circuit as mentioned above so that the width of the output pulse varies with the temperature. The output pulse is inverted by an inverter N3 to provide a pulse $\phi 12$. The relationship of timing between the pulses $\phi 11$ to $\phi 13$ is illustrated graphically in FIG. 13. The latch circuits FF4, FF5 latches the output signals from the comparators COM1, COM2 in response to the rising edge of the pulse $\phi 12$. Since the timing when the latch circuits latch occurs in the course of the output signal from the amplifier 7 being integrated by the integrating circuit 8, it follows that a variation in the output from the light projector can be compensated for through a change of the latch timing with temperature. By way of example, the latch timing may be as shown in FIG. 14A at normal temperatures. As the temperature rises, if no temperature compensation is made as in the prior art, the latch output will be reduced as compared with the value prevailing under normal temperatures because the output signal from the integrating circuit 8 is latched at the same timing as before as illustrated in FIG. 14C, despite the fact that the output signal from the amplifier 7 decreases in response to a reduction in the output from the light projector as shown in FIG. 14B. However, in accordance with the invention, the latch timing is changed so as to compensate for a variation in the output from the light projector with temperature, as illustrated in FIG. 14D, thus maintaining the same latch output as at normal temperatures.

FIG. 15 shows part of another embodiment of the invention, which also illustrates a further way of compensating for a variation in the output from the light projector, by controlling a charging resistance in the integrating circuit 8. In this embodiment, in contradistinction to the embodiment shown in FIG. 5, a monostable multivibrator MM used is not provided with a temperature compensation circuit and therefore produces a pulse of a given width. An integrating circuit 8 includes a charging resistance R12 which comprises a thermistor TH1, acting as a temperature detecting means, and resistors R121, R122. Consequently, the resistance of the charging resistor R12 varies with the temperature, allowing a compensation for a variation in the output from the light projector. As an example, FIG. 16A illustrates an output signal from an amplifier 7 and an output signal from an integrating circuit 8 at normal temperatures. When the temperature changes, an output signal from the amplifier 7. varies in response to a variation in the output from the light projector, as shown in FIG. 16B. In this instance, if the resistance of the charging resistor R12 were constant, the output signal from the integrating circuit 8 will be different from the value prevailing at normal temperatures, as shown in FIG. 16C, but a change of the resistance of the charging resistor R12 with the temperature enables the output signal from the integrating circuit 8 to be maintained at the same value as at normal temperatures, as illustrated in FIG. 16D.

FIG. 17 shows part of another embodiment of the invention which again provides a compensation for a variation in the output from the light projector by controlling reference voltages ref3, ref4. In this embodiment, a monostable multivibrator MM which is similar to that shown in FIG. 5, but which is not provided with a temperature compensation circuit is employed. A constant voltage ref0 is applied through a buffer B2 to a series combination of a resistor R23 and a thermistor TH2 which represents temperature detecting means. The thermistor TH2 is shunted by a series combination of a pair of variable resistors VR1, VR2, and the voltage developed at the movable tap of the variable resistors VR1, VR2 are applied as reference voltages ref3, ref4 to comparators COM1, COM2. In this manner, the magnitude of the reference voltages ref3, ref4 changes with the temperature to provide a compensation for a variation in the output from the light projector. By way of example, FIG. 18A indicates that an output from an integrating circuit 8 lies between the reference voltages ref3, ref4 when an object being photographed is located at a medium distance, for example. When the temperature rises, assuming that the magnitude of the reference voltages ref3, ref4 remains constant, the output will lie below the lower reference voltage ref3, so that a determination may be rendered that the object is located at a long distance, as shown in FIG. 18B. However, in the present embodiment, the magnitude of the reference voltages changes with the temperature, so that the output from the integrating circuit 8 remains intermediate both of the reference voltages ref3, ref4 to prevent a wrong determination, as indicated in FIG. 18C.

Figure 19:
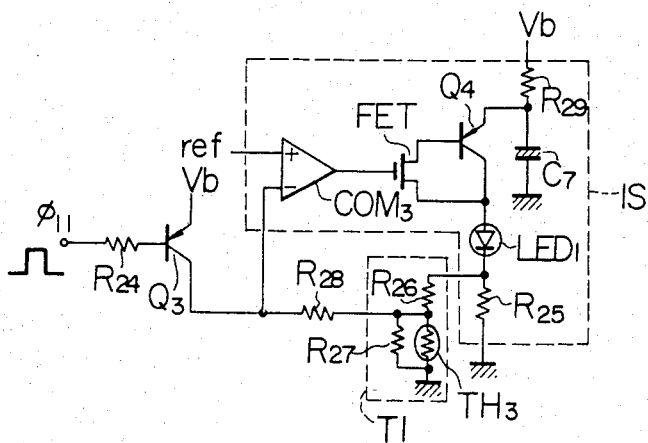
FIG. 19 is a circuit diagram of part of a further embodiment of the invention.
Figure 20:
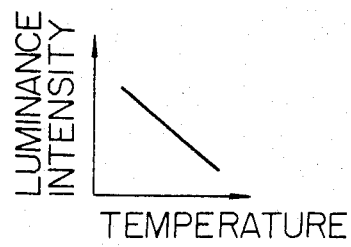
FIGS. 20 to 23 graphically show responses relating to the embodiment of FIG. 19.
Figure 21:
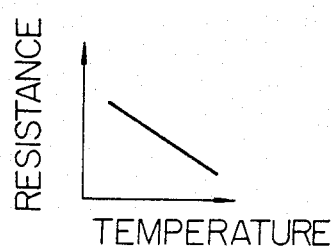
Figure 22:
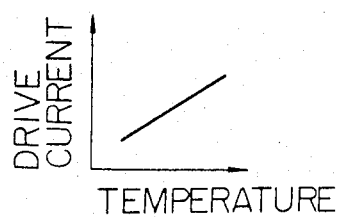
Figure 23:
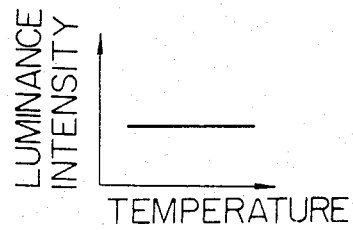

FIG. 19 shows part of a further embodiment of the invention which is effective to maintain the output from a light projector constant. In this embodiment, a monostable multivibrator MM used is similar to that shown in FIG. 5, but which is not provided with a temperature compensation circuit. When a pulse $\phi 11$ is applied through a resistor R24 to the base of a transistor Q3, the latter is turned off, and a constant current circuit IS assures that a current flow of a constant magnitude passes through a light projector LED1 for any fluctuation in the magnitude of the supply voltage Vb. In the constant current circuit IS, a current flow through the light emitting diode LED1 is supplied from a capacitor C7 through a path including a transistor Q4 and a field effect transistor FET. A voltage drop developed across a current detecting resistor R25 is divided by a temperature compensation circuit TI which comprises a thermistor TH3 and resistors R26, R27. The voltage developed at the junction between the resistors R26, R27 is supplied through a resistor R28 to an inverting input of a comparator COM3 to be compared against a reference voltage ref. Both the field effect transistor EET and the transistor Q4 are controlled by an output signal from the comparator COM3 so that there occurs a current flow of a constant magnitude through the light projector LED1. When a current flow of a constant magnitude is supplied to the light projector LED1, the luminous intensity or luminous efficiency changes with the temperature in a manner as indicated in FIG. 20. On the other hand, the thermistor TH3 has a temperature response as indicated in FIG. 21, and the voltage division ratio of the temperature compensation circuit TI changes with the temperature to vary the drive current of the light projector LED1 with the temperature in a manner as indicated in FIG. 22. As an overall effect, the projector LED1 projects a light beam of a given luminous intensity toward the object 4 being photographed irrespective of any temperature change, as indicated in FIG. 23. When no pulse $\phi$11 is applied and the transistor Q3 is turned on, the output from the comparator COM3 changes to a low level, whereby the field effect transistor FET and the transistor Q4 are turned off as is the light projector LED1. At this time, the capacitor C7 is charged through a resistor R29 to a supply voltage Vb.

Figure 24:
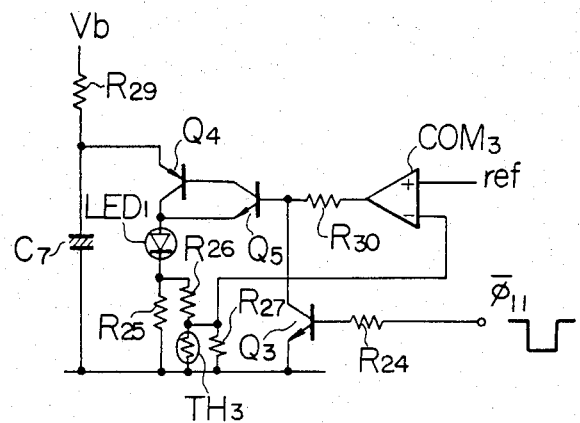
FIG. 24 is a circuit diagram of part of another embodiment of the invention.

FIG. 24 shows part of another embodiment of the invention which prevents a variation in the output from a light projector for any fluctuation in the supply voltage. The field effect transistor FET shown in FIG. 19 is replaced by a transistor Q5, to the base of which is applied an output from a comparator COM3 through a resistor R30. A voltage drop developed across a current detecting resistor R25 is directly applied to the comparator COM3, and the transistor Q3 controls the base potential of the transistor Q5.

Figure 26:
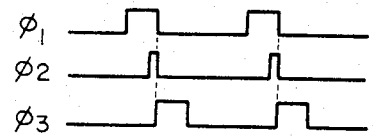
FIGS. 26 and 27A to 27C graphically show the operation of the embodiment shown in FIG. 25.
Figure 27A:
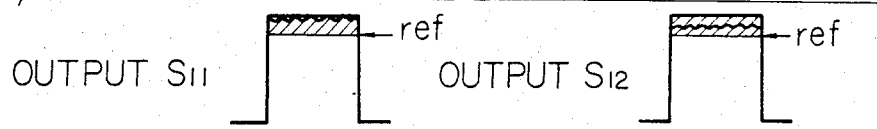
Figure 27B:
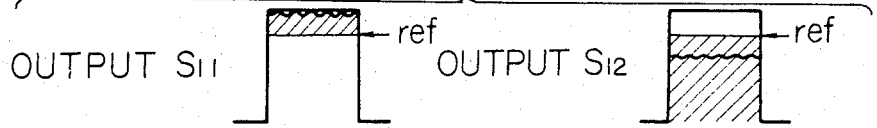
Figure 27C:
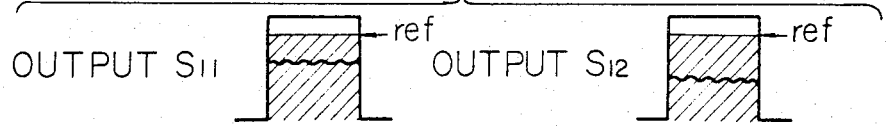
Figure 25:
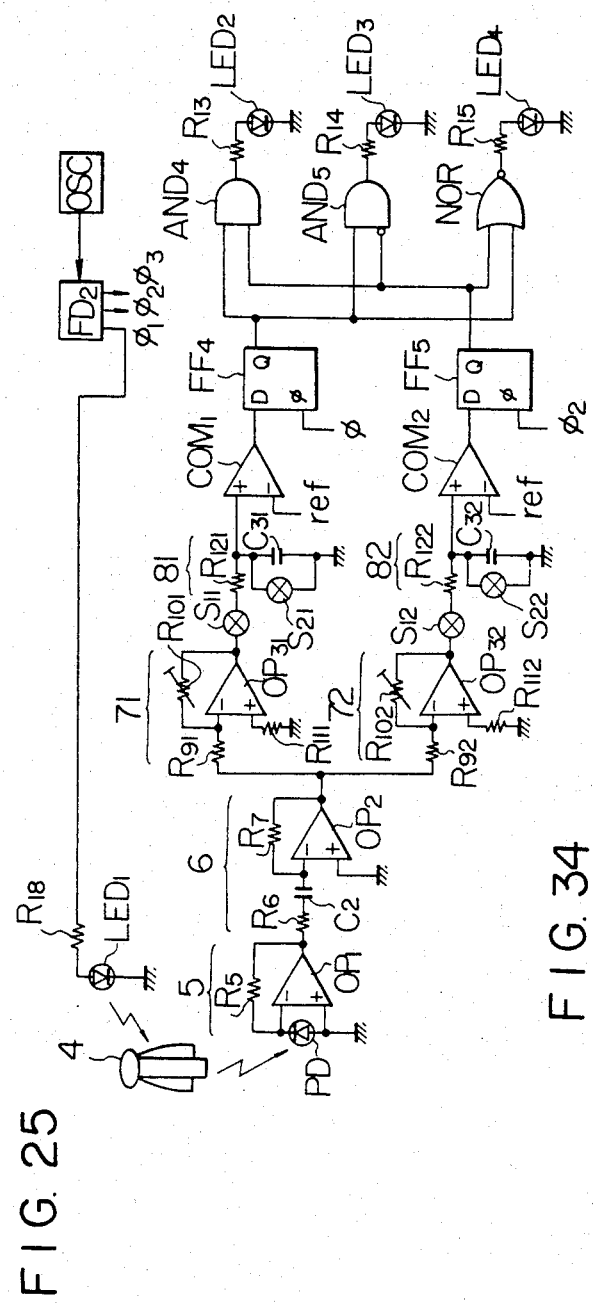
FIG. 25 is a circuit diagram of another embodiment of the invention.

FIG. 25 shows another embodiment of the invention. In this embodiment, a frequency divider FD2 frequency-divides a pulse of a given frequency which is produced by an oscillator OSC to provide three different pulses $\phi$1 to $\phi$3. These pulses are synchronized with each other with a timing as illustrated in FIG. 26. Specifically, the pulse $\phi$2 is synchronized with the falling edge of the pulse $\phi$1, and the pulse $\phi$3 rises in coincidence with the falling edge of the pulse $\phi$1. A light projector LED1 is formed by a light emitting diode, and the pulse $\phi$1 is applied thereto through a buffer B and a resistor R18, thus projecting a light beam toward an object 4 being photographed in a periodic manner. External light inclusive of reflected light from the object 4 impinges upon a light receiver PD, which comprises a photodiode, to be converted into an electrical signal. The resulting electrical signal is passed through a sensor amplifier 5 to be fed to a high pass filter 6. An output signal from the high pass filter 6 is fed to pair of parallel connected amplifiers 71, 72, which comprises operational amplifiers OP31, OP32, resistors R91, R111 and variable resistors R101, R102, to be amplified thereby. Thereafter, each output from these amplifiers is passed through an analog switch S11 or S12 to be integrated by an integrating circuit 81 or 82, each comprising a resistor R121 or R122 and a capacitor C31 or C32. The analog switches S11, S12 are turned on by the pulse $\phi$1 from the frequency divider FD2, and function to extract only that fraction of the output signal from the amplifiers 71, 72 developed in response to reflected light from the object being photographed which corresponds to the projector unit. A pair of analog switches S21, S22 are turned on by the pulse $\phi$3 from the frequency divider FD2 to reset the integrating circuits 81, 82. Each output signal of the integrating circuits 81, 82 is compared against a reference value ref in a pair of comparators COM1, COM2, the output signals of which are latched into D-type flipflops FF4, FF5, respectively, in response to the pulse $\phi$2 from the frequency divider FD2. Suitable different gains are established in the amplifiers 71, 72 by means of variable resistors R101, R102 in a manner such that the output of the analog switch S11 will be above the reference voltage ref if the distance to be object 4 being photographed is in a short or a medium range, but will be below the reference voltage ref if the object 4 is located in a long distance range while the output of the analog switch S12 will be above the reference voltage ref if the object 4 is located in a short distance range, but will be below the reference voltage if the object 4 is located in a medium or a long distance range, as illustrated in FIGS. 27A to 27C. In FIGS. 27A to 27C, hatched areas represent those regions where the outputs from the analog switches S11, S12 may exist. By providing different values of gains in a circuit portion which precedes the comparators COM1, COM2, the respective ranges can be determined by fully utilzing the magnitude of a supply voltage to increase the reference level associated with each range. Thus, immunity against noises is improved.

Figures 28, 38:
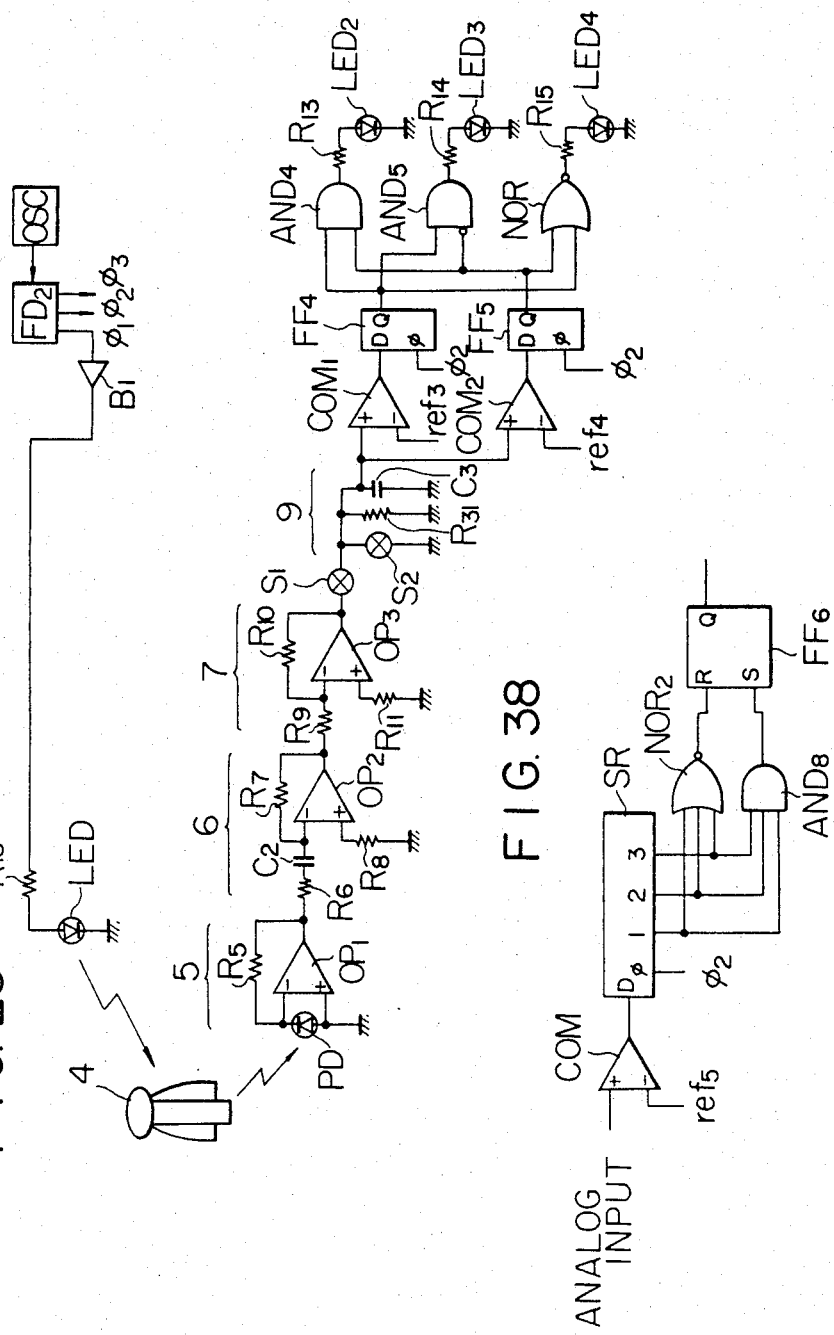
FIG. 28 is a circuit diagram of a further embodiment of the invention.
FIG. 38 is a block diagram of another form of noise elimination circuit which may be used in the present invention.
Figure 30:
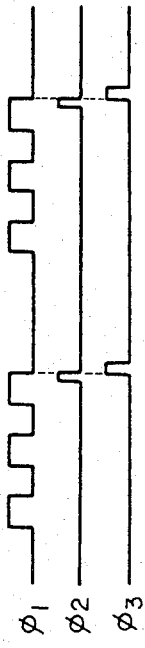
FIGS. 29, 30, 31 and 32 graphically illustrate certain waveforms which are useful in understanding the operation of the embodiment shown in FIG. 28.
Figure 29:
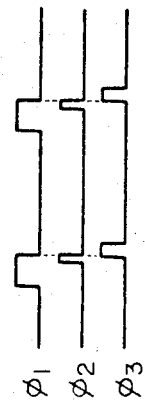

FIG. 28 shows another embodiment of the invention. A pulse of a given frequency which is produced by an oscillator OSC is frequency-divided by a frequency divider FD2 to provide three different pulses $\phi$1, $\phi$2 and $\phi$3. Relative timing of occurrence of such pulses is illustrated in FIG. 29 where it will be noted that the pulse $\phi$2 is produced toward the falling edge of the pulse $\phi$1 while the pulse $\phi$3 rises in coincidence with the falling edge of the pulse $\phi$1. As shown in FIG. 30, the pulse $\phi$2 may be produced after a plurality of pulses $\phi$1 have been produced, which may be three in number in the example shown, at a timing which is close to the falling edge of the last pulse $\phi$1. The pulse $\phi$3 may rise in coincidence with the falling edge of the last pulse $\phi$1. In this embodiment, the integrating circuit 8 of the previous embodiments is replaced by an averaging circuit 9, by adding a resistor R31.

Figure 31:
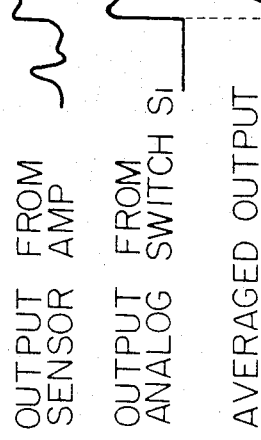

FIG. 31 illustrates a timig chart which will be obtained when the pulses $\phi$1 to $\phi$3 as illustrated in FIG. 29 are produced by the frequency divider FD2. In this instance, a single average is obtained for each projection of light beam.

Figure 32:
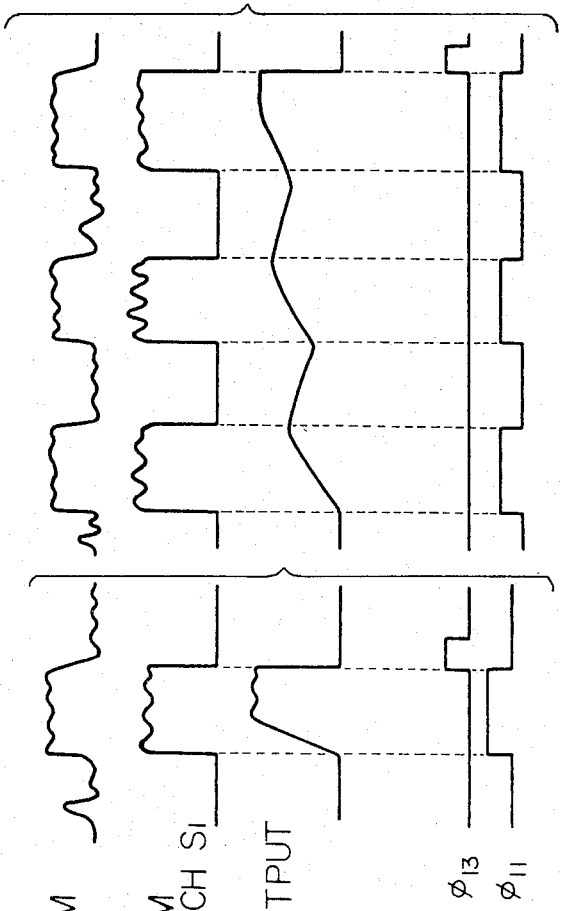

FIG. 32 illustrates a timing chart which will be obtained when the pulses $\phi$1 to $\phi$3 as illustrated in FIG. 30 are produced by the frequency divider FD2. In this instance, a single average occurs for three projections of light beam, allowing an improved immunity against noises to be expected.

It will be seen from above description that by using a semiconductor switch S1 to extract a fraction of the received signal which corresponds to the projected beam, a discrimination over extraneous light is improved. In addition, by integrating or averaging the received signal, the immunity against noises is improved, assuring an improved accuracy.

FIG. 33 shows one form of noise elimination circuit which utilizes a three-bit shift register. An analog input is compared against a reference voltage ref5 in a comparator COM4 to be converted into either a high level H or a low level L digital signal. Thus, the comparator operates to convert the analog input into a binary signal. The digital signal is latched into and shifts through a shift register SR in response to a rising edge of the pulse $\phi$2. A full adder FA1 adds the first and the second bit output of the shift register SR together while a full adder FA2 adds the third bit output of the shift register SR together with the sum signal and the carry signal from the full adder FA1. The carry signals from both full adders FA1, FA2 are fed to an OR circuit OR1, the output signal of which will assume an H level if more than one bit outputs from the shift register SR assume an H level. Accordingly, if only one of three consecutive digital signals from the comparator COM4 assumes an H level, it is eliminated as a noise.

The shift register SR may have an arbitrary number of bits or stages so that an associated logical circuit may detect that a given number of bits, for example, three or four bits of five bits assume an H level to thereby produce an H level output, thus permitting noises to be eliminated in any desired manner.

In this arrangement, the noises are eliminated in accordance with the frequency of occurrence thereof independently from the noise level, in contradistinction to the processing by the analog circuit, so that the processing may be performed in a digital circuit, permitting the elimination of a high noise level. This arrangement is particularly effective to eliminate noises of high levels, and can eliminate noises without introducing the level hysteresis effect.

Figure 34:
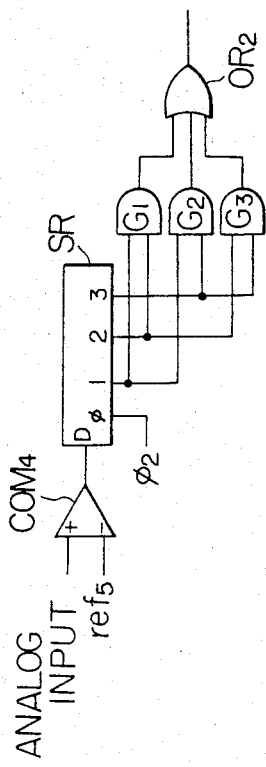

FIG. 34 shows another form of noise elimination circuit which utilizes gate circuits. In this instance, different combinations of two-bit outputs from the shift register SR are individually fed to two input gate circuits G1 to G3, the outputs of which feed OR circuit OR2. The elimination of noises takes place in the same manner as before.

FIG. 35 is a timing chart for illustrating the operation of the circuit arrangement shown in FIG. 34. Although a noise N of a high level which is contained in the analog input could not have been eliminated with the prior art circuit, it can be eliminated with the circuit arrangement of FIG. 34.

FIG. 36 shows a further embodiment of the invention. In this instance, a pulse from an oscillator OSC is frequency-divided by a frequency divider FD2 to produce three kinds of pulses $\phi 1$ to $\phi 3$, the timing of which is illustrated in FIG. 37. An output signal from an integrating circuit 8 is compared against the reference voltage ref5 in a comparator COM4, whereby a digital signal of either H or L level is obtained depending on whether an object 4 being photographed is located at a short distance or at a long distance. A shift register SR, gate circuits G1 to G3 and OR circuit OR2 form together a noise elimination circuit 10 which is similar to that shown in FIG. 34, thus eliminating noises from the digital signal produced by the comparator COM4. An output signal from the noise elimination circuit 10 is applied through a resistor R32 to a light emitting diode LED5, which indicates that the object being photographed is located at a short distance, within the viewfinder of a camera. An output signal from the noise elimination circuit 10 is also applied through an inverter IN and a resistor R33 to a light emitting diode LED6, which indicates that the object being photographed is located at a long distance, within the viewfinder.

The noise elimination circuit 10 effectively eliminates noises produced by fluorescent lamps as well as random noises without introducing the level hysteresis effect, thus improving the accuracy of distance determination. It should be understood that the noise elimination circuit 10 may be constructed by utilizing full adders in the similar manner as illustrated in FIG. 33. Alternatively, an output signal from the integrating circuit 8 may be fed to a plurality of comparators having different reference voltages, and the output signals from these comparators may be applied through individual noise elimination circuits to a decision block, which determines a particular one of a plurality of distance ranges in which the object 4 being photographed is located, with such result being displayed by a display.

FIG. 38 shows a further form of noise elimination circuit which may be used in present invention. In this instance, all the bit outputs of a shift register SR are applied to a NOR circuit NOR2 and an AND circuit AND8. A flipflop FF6 is connected to be set by an output from the AND circuit AND8 and reset by an output from the NOR circuit NOR2. The Q output of the flipflop FF6 assumes an H level whenever all the bit outputs of the shift register SR assume an H level, and will assume an L level whenever all the bit outputs of the shift register SR assume an L level. Consequently, if only one or two bit outputs of the shift register SR assume H or an L level, the Q output of the flipflop FF remains unchanged from its previous condition. In other words, there is produced a hysteris effect in the frequency of occurrence which is made as the basis for the level determination of the digital signal. If noises are frequently produced to make it difficult to determine if the digital signal assumes an H or an L level, the digital signal is caused to maintain its previous condition while when the occurrence of noises is reduced to permit the determination of the true condition of the digital signal, the level of the digital signal is determined accordingly.

What is claimed is:
1. A distance measuring circuit comprising:
a light projecting means for projecting a light beam toward a target;
a light receiver means for receiving reflected light from said target and outputting a signal; and
means for determining the level of said signal from said light receiver means including a plurality of amplifiers with each of said amplifiers having a different gain and each of said amplifiers outputting an amplified signal and wherein said determining means further includes a plurality of comparison means for comparing the respective said amplified output signals from said plurality of amplifiers with respective associated reference voltages, wherein the gain of each of said amplifiers is determined in accordance with each of said respective reference voltages whereby the operation of said light projecting means, said light receiver means and said determining means is controlled in a predetermined sequence by control means.

* * * * *